(12) United States Patent
Lays et al.

(10) Patent No.: US 6,216,805 B1
(45) Date of Patent: Apr. 17, 2001

(54) DUAL GRADE CARBIDE SUBSTRATE FOR EARTH-BORING DRILL BIT CUTTING ELEMENTS, DRILL BITS SO EQUIPPED, AND METHODS

(75) Inventors: Roger Lays, Corpus Christi; Mohammad Swadi, The Woodlands, both of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/351,509

(22) Filed: Jul. 12, 1999

(51) Int. Cl.$^7$ ...................................................... E21B 10/46
(52) U.S. Cl. ........................................... 175/374; 175/432
(58) Field of Search ..................................... 175/432, 433, 175/434, 431, 428, 374

(56) References Cited

U.S. PATENT DOCUMENTS

| | | |
|---|---|---|
| 2,121,202 | 6/1938 | Killgore . |
| 4,339,009 | 7/1982 | Busby . |
| 4,359,335 | 11/1982 | Garner . |
| 4,907,665 | 3/1990 | Kar et al. . |
| 4,959,929 | 10/1990 | Burnand et al. . |
| 4,997,049 | 3/1991 | Tank et al. . |
| 5,217,081 | 6/1993 | Waldenstrom et al. . |
| 5,348,108 | 9/1994 | Scott et al. . |
| 5,355,750 | 10/1994 | Scott et al. . |
| 5,431,239 | 7/1995 | Tibbitts et al. . |
| 5,445,231 | 8/1995 | Scott et al. . |
| 5,492,188 | 2/1996 | Smith et al. . |
| 5,607,024 | 3/1997 | Keith et al. . |

FOREIGN PATENT DOCUMENTS

| | | |
|---|---|---|
| 2261894 | 6/1993 | (GB) . |
| 2279677 | 1/1995 | (GB) . |

OTHER PUBLICATIONS

U.S. application No. 09/231,350 of Butcher et al. filed Jan. 13, 1999.

*Primary Examiner*—Frank Tsay
(74) *Attorney, Agent, or Firm*—TraskBritt

(57) ABSTRACT

A cutting element substrate for use with an earth-boring drill bit. The substrate includes a base, or outer shell, with a cavity opening to an end thereof. The base is fabricated from an erosion-resistant and abrasion-resistant material. A core that is configured substantially complementarily to the cavity is disposed within the cavity. The core base is fabricated from a material that is more ductile than the material of the base. The core and base each includes a cutting end to which a superabrasive cutting table, such as a polycrystalline diamond compact, may be secured. The substrate may be secured within a corresponding receptacle of a bit body in order to secure a superabrasive cutting table to the bit body in a desired orientation. The present invention also includes methods of fabricating the cutting element substrate.

70 Claims, 5 Drawing Sheets

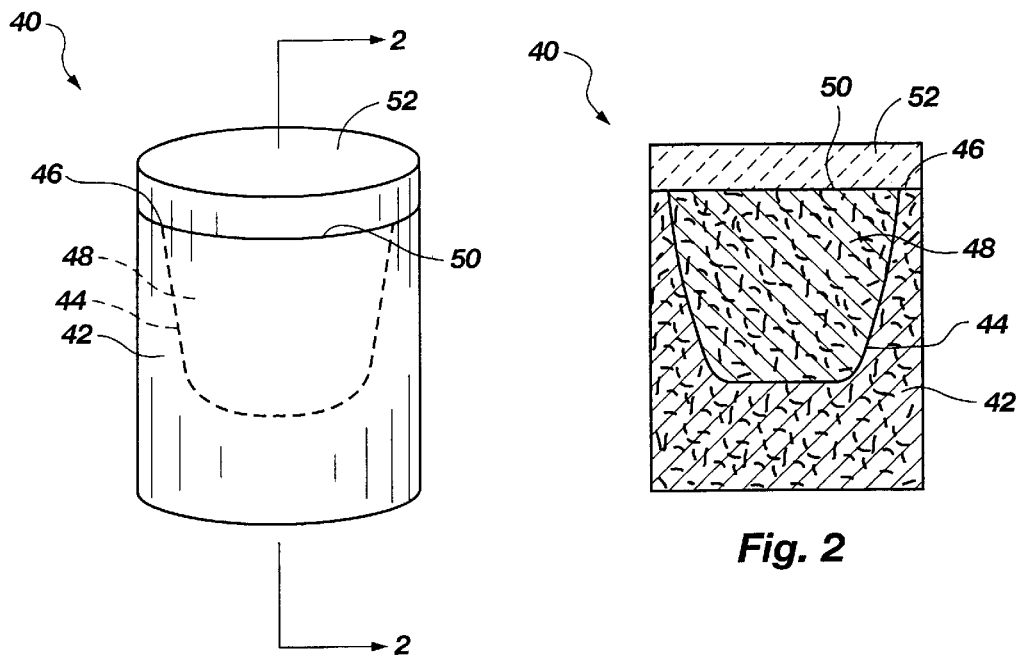
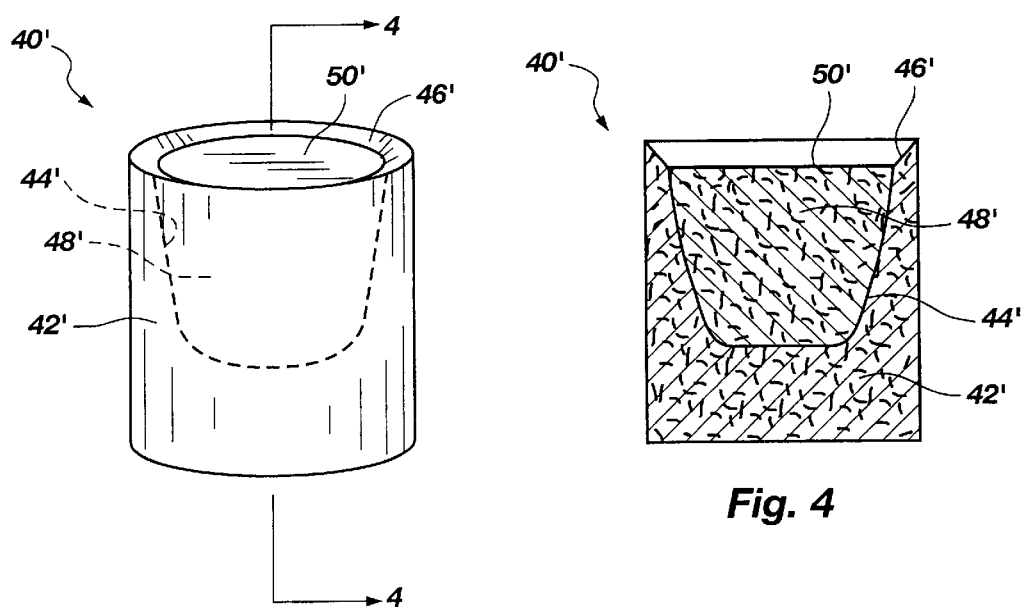

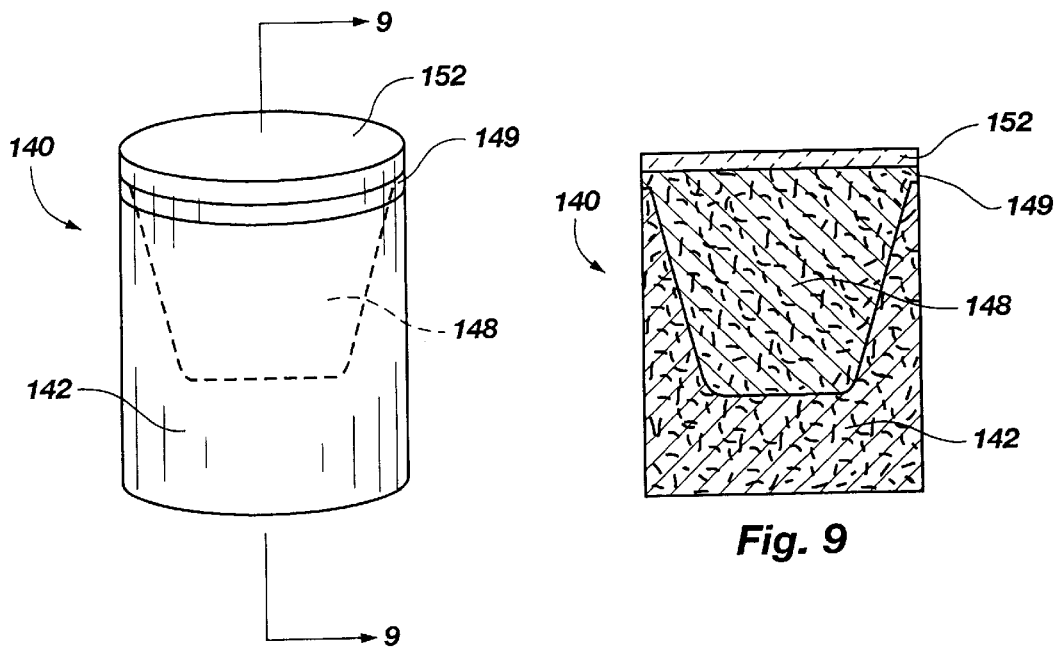
Fig. 8
Fig. 9
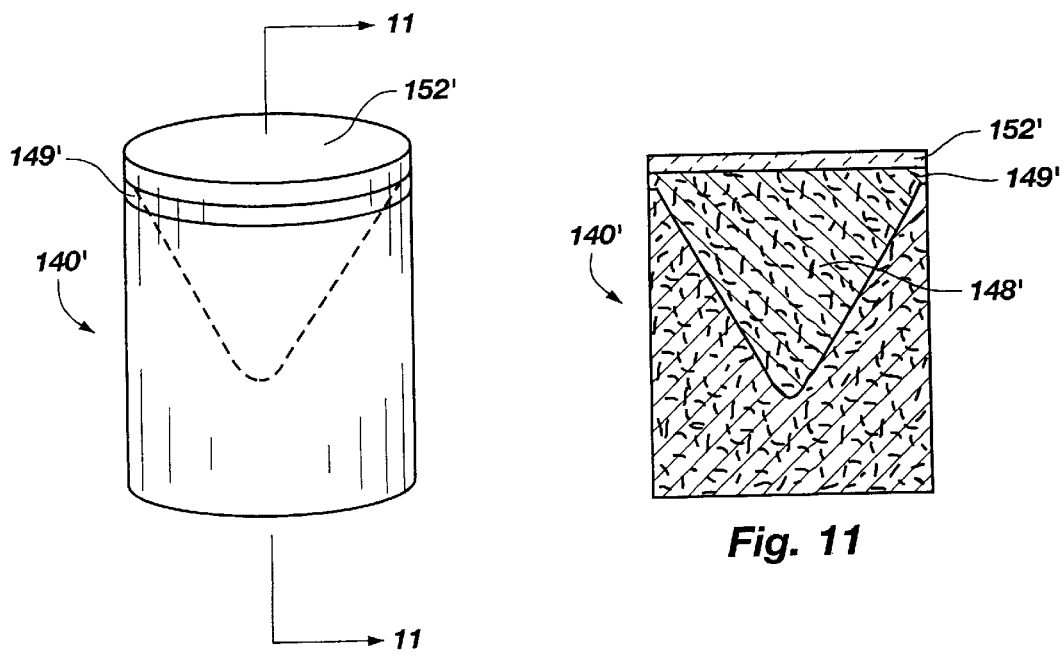
Fig. 10
Fig. 11

DUAL GRADE CARBIDE SUBSTRATE FOR EARTH-BORING DRILL BIT CUTTING ELEMENTS, DRILL BITS SO EQUIPPED, AND METHODS

BACKGROUND OF THE INVENTION

1. Field of the Invention

The present invention relates to substrates for cutting elements for use in earth-boring drill bits, to cutting elements incorporating such substrates, and to drill bits so equipped. Particularly, the present invention relates to erosion-resistant and abrasion-resistant cutting element substrates that can also absorb impacts that may be incurred during drilling. More particularly, the present invention relates to cutting elements including substrates having an erosion-resistant and abrasion-resistant region adjacent a periphery of an associated superabrasive cutting table and a more ductile, impact absorbent internal region.

2. Background of Related Art

Cutting element substrates have conventionally been employed as a means for securing cutting elements upon the faces of rotary drag bits in appropriate locations and orientations. Conventional cutting element substrates typically include a cemented carbide base and a superabrasive cutting table of desired configuration secured to the base in a desired orientation. Typically, the cemented carbide bases of these cutting element substrates include a single type of cemented carbide. When the base of a conventional cutting element substrate includes a tungsten carbide matrix and a cobalt binder, the erosion-resistance; abrasion-resistance, and toughness or ductility of the cutting element depend upon the grain size of the tungsten carbide and the relative proportions of tungsten carbide and cobalt. As is well known in the art, cemented carbide structures that include carbides having smaller grain sizes are more erosion-resistant and abrasion-resistant than cemented carbide structures with larger grains of carbide. Moreover, cemented carbides that include higher proportions of a binder, such as cobalt, are tougher, more ductile, and more impact resistant, and less erosion-resistant and abrasion-resistant than cemented carbides that include lesser amounts of binder.

Accordingly, conventional cutting element substrates, which typically include only one type of cemented carbide, may lack either ductility, toughness, and impact resistance or erosion-resistance and abrasion-resistance. Cutting element substrates with good erosion-resistance and abrasion-resistance but relatively low ductility resist excessive wearing behind the superabrasive cutting tables secured thereto and, therefore, prevent breaking away of the superabrasive cutting tables supported thereby, thus imparting the superabrasive cutting tables with an increased cutting life. Erosion-resistant and abrasion-resistant cutting element substrates are, however, relatively more prone to fracturing or shattering under impacts that may be incurred during drilling than more ductile cutting element substrates. More specifically, when erosion-resistant and abrasion-resistant materials, which typically have low impact resistance, are employed as the cutting element substrate, if a superabrasive cutting table is exposed to a fracture-generating impact, the adjacent substrate may also likely fracture. Thus, the superabrasive material of the cutting tables that are secured to the erosion-resistant and abrasion-resistant cutting element substrates, as well as the substrates themselves, may be damaged or lost prior to the ends of the useful lives of the cutting tables or of the entire cutting elements.

While more ductile cutting element substrates may better withstand the impacts that may be incurred during drilling, the relatively low erosion-resistance and abrasion-resistance of more ductile cutting element substrates may cause them to wear undesirably fast, especially at the exposed peripheral regions thereof, located adjacent the superabrasive cutting tables disposed thereon. Thus, the superabrasive cutting tables that are secured to these more ductile cutting element substrates may become unsupported proximate their locations of contact with a formation being drilled and may, therefore, be broken during cutting. Consequently, the useful lives of superabrasive cutting tables that are disposed on more ductile cutting element substrates may be reduced.

U.S. Pat. No. 4,359,335 (hereinafter "the '335 Patent"), which issued to Lloyd L. Garner on Nov. 16, 1982, discloses a rock bit insert that includes a cemented carbide base of a first composition with a more erosion-resistant and abrasion-resistant wear pad secured thereto and acting as a cutting surface. Thus, the wear pad of the insert of the '335 Patent is erosion-resistant and abrasion-resistant and is, therefore, useful for contacting a formation material in a borehole and for preventing boring of an undersized borehole. The wear pad does not, however, comprise a superabrasive material. Nor is the structure of the '335 Patent suitable for use as a cutting element for rotary drag bits that may be employed to bore very hard, abrasive formations.

U.S. Pat. No. 5,431,239 (hereinafter "the '239 Patent"), which issued to Gordon A. Tibbitts et al. on Jul. 11, 1995, discloses a cutting element substrate that includes an inner core of a material of enhanced fracture toughness surrounded by an outer layer of abrasion resistant material. The inner core of the substrate extends substantially through the length thereof. The materials of the inner core and the outer layer of the substrate have different coefficients of thermal expansion. According to the '239 Patent, upon cooling the materials from an elevated temperature, the material of the outer layer contracts or shrinks more quickly than the material of the inner core. Thus, an interference fit secures the outer layer to the inner core. However, undesirable residual stresses exist in the substrate of the cutting element of the '239 Patent due to the use of materials having different coefficients of thermal expansion.

Similar cutting element substrates are disclosed in U.S. Pat. No. 5,492,188 (hereinafter "the '188 Patent"), which issued to Redd H. Smith on Feb. 20, 1996. One embodiment of cutting element substrate disclosed in the '188 Patent includes three concentrically alignable structures. The center structure is configured as a ring and is fabricated from a tough and ductile material such as a metal or metal substrate. The innermost of the three structures is fabricated from an erosion-resistant and abrasion-resistant material such as a cemented carbide and extends substantially through the length of the substrate. In fabricating this embodiment of the substrate, the three structures are independently fabricated, then aligned and assembled with one another. These structures may then be secured to one another by means of high pressure and high temperature processes. An assembly method requiring alignment of the three structures is somewhat undesirable, however, in that additional fabrication time is required and the cutting elements cannot, therefore, be fabricated very efficiently.

On information and belief, there exists another cutting element including a substrate having a tough, ductile, and impact resistant outer shell and an erosion-resistant and abrasion-resistant inner core. This configuration is, however, somewhat undesirable since the outer shell may wear during use and, therefore, fail to adequately support the cutting table disposed thereon, while the inner core provides little useful impact resistance.

Accordingly, there is a need for a cutting element substrate with an erosion-resistant and abrasion-resistant peripheral region to provide better edge support for a superabrasive cutting table disposed on the cutting element and with a more ductile interior optimized to absorb residual stresses throughout the superabrasive cutting table and, thereby, maximize the useful life of the cutting element substrate and the superabrasive cutting table disposed thereon. There is also a need for such a cutting element substrate that can be efficiently fabricated. There are further needs for cutting element substrates that better withstand temperature changes and for cutting elements that are easily brazeable to a bit body.

SUMMARY OF THE INVENTION

The present invention includes a cutting element substrate for use with an earth-boring drill bit. The cutting element includes a base, which is also referred to herein as an outer shell, including an erosion-resistant and abrasion-resistant material. The base is configured complementarily to a corresponding receptacle of a drill bit with which the cutting element is to be assembled. Thus, the outer surface of the base may, by way of example, have a substantially cylindrical shape. A close-ended cavity is located substantially centrally within the base and is open to an end of the base. The cavity is configured to receive a complementarily shaped core of the cutting element.

The core of the cutting element substrate of the present invention includes a more ductile material than the base. The material of the base is preferably more erosion-resistant and abrasion-resistant than the material of the core. When assembled with the base, the core preferably fits substantially within the base. An exposed end of the core, which is also referred to herein as a cutting end of the core, may be flush with a corresponding, adjacent end of the base, which is also referred to herein as a cutting end of the base, or may be recessed relative to the corresponding, adjacent end of the base.

A cutting end of the cutting element, including the cutting end of the core and the corresponding, adjacent cutting end of the base, which may surround at least a portion of the periphery of the core, is configured to have a superabrasive cutting table secured thereto. The periphery of the base around the core provides stiffness against bending of the superabrasive cutting table. Any suitable type of superabrasive cutting table known in the art, such as, by way of example only, a polycrystalline diamond compact ("PDC"), a thermally stable PDC ("TSP"), or a boron nitride ("BN") structure, may be formed on the substrate.

A first embodiment of a method of fabricating the cutting element substrate includes performing the base and the core to desired, substantially complementary configurations, assembling the preformed base and core, and integrally sintering or hot isostatic pressing ("HIP") the assembly to form a finished cutting element substrate.

Another embodiment of the method of fabricating the cutting element substrate includes individually fabricating the base and the core by known processes, such as by sintering or hot isostatic pressing. The base and the core may then be assembled and secured to one another by known processes, such as by mechanical means, by brazing, or with pressure and/or heat.

In yet another embodiment of the cutting element substrate fabrication method of the present invention, the cutting element may be fabricated by disposing a mixture of a matrix material and a binder into a mold to form an erosion-resistant and abrasion-resistant base and sintering or hot isostatic pressing the mixture by known processes. The base may then be disposed in another mold within which another mixture of a matrix material and a binder material are also disposed so as to substantially fill the cavity of the base. The second mixture of matrix material and binder may be sintered or hot isostatically pressed to form the core of the cutting element substrate and to substantially simultaneously integrally bond the base and the core to one another.

Another embodiment of the fabrication method of the present invention includes prefabricating the base of a first cemented carbide and a complementarily shaped core of a second cemented carbide by known processes. Preferably, the base and core are fabricated by processes such as sintering or HIP so that the configuration of the cutting surface of the core is substantially determined before a superabrasive cutting table is formed thereon. The base and core may be assembled and disposed within a diamond press with diamond crystals or crystals of another superabrasive material adjacent the exposed surface of the core. The base, core, and superabrasive crystals may then be integrally pressed together by the diamond press, as known in the art, substantially simultaneously with the fabrication of the cutting table from the superabrasive crystals.

The relative proportions of the mixtures of the matrix material and binder employed in each of the foregoing fabrication methods are preferably appropriate to impart the base and the core of the cutting element substrate with the desired properties (i.e., erosion-resistance and abrasion-resistance for the base and ductility for the core). The relative proportions of matrix material and binder may be readily determined by one of skill in the art.

The cutting element substrate according to the present invention improves the cutting edge support of the superabrasive cutting table secured thereto while increasing the stiffness of the substrate to support the superabrasive cutting table. Further, the use of multiple carbide grades optimizes residual stresses throughout the cutting element. For example, the mismatch in thermal expansion between the two different grades of carbide may be employed to distribute residual stresses more evenly across the cutting element so as to minimize the likelihood that the cutting table or the cutting element will fracture under an impact. Alternatively, the residual stresses may be concentrated in one or more desired locations by varying the relative hardnesses of the materials, the dimensions of the base and the core, the configurations of the base and the core, or otherwise.

Moreover, since the cutting element substrate of the present invention includes a base and a core of two, respectively different, grades of cemented carbide, any impact-induced fractures of the cutting table and of the adjacent substrate may be terminated at the interface between the base and the core. Thus, the configuration of the substrate of the present invention may reduce the likelihood that a fractured superabrasive cutting table may be lost and, thereby, increase the useful life of the cutting element and the superabrasive cutting table thereof.

The brazeability of the substrate to a bit body is also enhanced when the cutting element substrate according to the present invention is employed.

Other features and advantages of the present invention will become apparent to those of ordinary skill in the art through a consideration of the ensuing description, the accompanying drawings, and the appended claims.

BRIEF DESCRIPTION OF THE SEVERAL VIEWS OF THE DRAWING

FIG. 1 is a perspective view of a first embodiment of the cutting element substrate of the present invention, including a superabrasive cutting table secured thereto;

FIG. 2 is a cross-section taken along line 2—2 of FIG. 1;

FIG. 3 is a perspective view of a second embodiment of the cutting element substrate of the present invention, without a superabrasive cutting table secured thereto;

FIG. 4 is a cross-section through line 4—4 of FIG. 3;

FIG. 8 is a perspective view of a third embodiment of the cutting element substrate of the present invention;

FIG. 9 is a cross-section taken along line 9—9 of FIG. 8;

FIG. 10 is a perspective view of a variation of the cutting element substrate of FIG. 8, wherein the shapes of the cavity and the core of the cutting element substrate are different from the shapes of the cavity and core of the cutting element substrate of FIG. 8;

FIG. 11 is a cross-section taken along line 11—11 of FIG. 10;

DETAILED DESCRIPTION OF THE INVENTION

Figure 7:
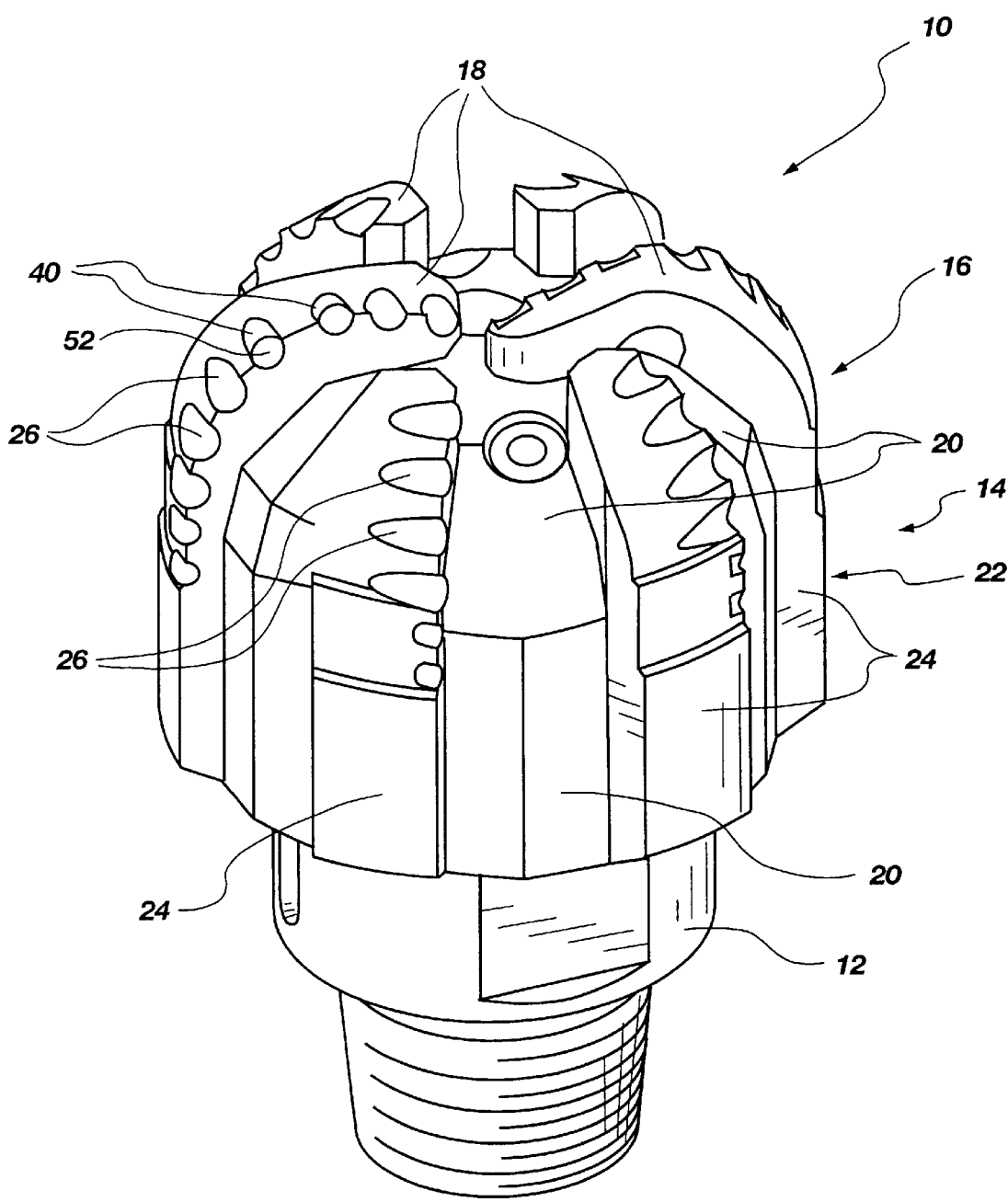
FIG. 7 is a partial perspective view of a rotary-type earth-boring drill bit with which the cutting element of the present invention may be assembled.

With reference to FIG. 7, a fixed cutter or a drag-type earth-boring rotary drill bit 10 of typical configuration is illustrated. The drill bit 10 of FIG. 7 is shown in an inverted orientation relative to its orientation when employed in drilling operations in order to clearly illustrate the features on the face 16 thereof. Drill bit 10 includes a bit body 14 with a shank 12 extending from an end thereof and securable to a drill string of a type known and employed in the art. As illustrated, bit body 14 includes six substantially radially extending blades 18. Blades 18 are separated from one another by fluid channels 20 that extend substantially longitudinally across face 16 of bit body 14.

Drill bit 10 also includes a gage region 22, which is located between face 16 and shank 12. Gage pads 24, which extend substantially longitudinally along the face of gage 22, may be arranged to be substantially continuous with their corresponding blades 18. Thus, fluid channels 20 may also extend substantially longitudinally across gage 22, between adjacent blades 18.

Blades 18 may include receptacles or pockets 26 within which cutting element substrates 40, which are also referred to herein as substrates for simplicity, may be disposed and oriented so as to cut earth or rock in a desired manner. Conventional substrates typically include an erosion-resistant and abrasion-resistant carbide matrix disposed in a binder material. Tungsten carbide is typically employed as the carbide matrix, while cobalt is typically employed as the binder material. A superabrasive cutting table 52, such as a PDC, TSP, or boron nitride structure, is typically oriented upon and secured to substrate 40 so as to have a desired rake, or cutting, angle as substrate 40 is oriented and disposed upon drill bit 10.

FIG. 1 illustrates a first embodiment of a substrate 40 according to the present invention. Substrate 40 includes a base 42 with a cavity 44 therein. Cavity 44 opens to a cutting end 46 of base 42. Cutting element substrate 40 also includes a core 48 configured complementarily to and disposable within cavity 44 of base 42. As illustrated, when core 48 is disposed within cavity 44 of base 42, cutting end 46 of base 42 and a cutting end 50 of core 48 are substantially flush. A superabrasive cutting table 52 of a type known in the art, such as a PDC, TSP, or boron nitride superabrasive cutting table, may be formed onto cutting end 50 of core 48 by known processes, such as by high pressure, high temperature pressing of superabrasive particles thereon in the presence of an appropriate catalyst.

Base 42 is preferably fabricated from an erosion-resistant and abrasion-resistant material. Preferably, base 42 is more erosion-resistant and abrasion-resistant than core 48. For example, base 42 may comprise a carbide matrix (e.g., tungsten carbide) and a binder material (e.g., cobalt). As is well known in the art, cemented carbide structures that have larger proportions of carbide relative to the binder material thereof are typically more erosion-resistant and abrasion-resistant than carbide structures that include smaller proportions of carbide relative to the binder material thereof. Thus, as relatively more binder is employed to fabricate base 42, the erosion-resistance and abrasion-resistance of base 42 decreases. Cemented carbide structures that have smaller grains of carbide are also typically more erosion-resistant and abrasion-resistant, but less tough, ductile, and impact-resistant, than cemented carbide structures formed with larger grains of carbide. Accordingly, one of skill in the art would readily be able to determine the relative proportions of matrix material and binder or the appropriate grain size of matrix material (e.g., 1 $\mu$m to 10 $\mu$m) to impart base 42 with the desired amount of erosion-resistance and abrasion-resistance.

Core 48, which is preferably more ductile than base 42, may also be fabricated from a material including a matrix of erosion-resistant and abrasion-resistant material and a more ductile binder. Tungsten carbide is an exemplary material that may be employed as the matrix material of core 48. Cobalt may be employed as the binder material of core 48. As is well known to those of skill in the art, the relative proportions of erosion-resistant and abrasion-resistant matrix material and of ductile binder material will impart core 48 with a particular amount of erosion-resistance, abrasion-resistance, toughness, ductility, and impact-resistance. Accordingly, one of skill in the art would be readily able to determine the proportions of a particular matrix material and a particular binder material of the appropriate grain size of matrix material (e.g., from about 10 $\mu$m to about 1 $\mu$m) that would impart core 48 with the desired amount of ductility.

Therefore, base 42 preferably has a greater carbide content, by volume, than the carbide content of core 48. The greater carbide content of base 42 may impart base 42 with greater erosion-resistance and abrasion-resistance than core 48.

Of course, other materials may be employed as the matrix material and as the binder of both base 42 and core 48. For example and not by way of limitation, the matrix material may include tungsten carbide, tungsten molybdenum carbide, silicon carbide or mixtures thereof. The binder may similarly include, without limitation, cobalt, iron, nickel, an iron-nickel alloy, an iron-nickel-cobalt alloy, or any mixture thereof.

Cavity 44 is close-ended, opens to cutting end 46 of base 42, and extends only partially into base 42. Accordingly, the sides and an end of cavity 44 are defined by base 42. By way of example only, cavity 44 may be configured to have a truncated ellipsoidal shape (e.g., a cup shape), a conical shape, a frustoconical shape, or a hemispherical shape. Preferably, base 42 and cavity 44 are configured to position residual stresses of substrate 40 in desired locations and to impart substrate 40 with a desired distribution of residual stresses that may be imposed upon substrate 40 by the different materials of base 42 and core 48. Accordingly, the different material properties of base 42 and core 48 may be considered in configuring base 42 and cavity 44.

Since, upon assembly, cutting end 46 of base 42 and cutting end 50 of core 48 are substantially flush, when substrate 40 is employed to cut a bore hole into earth or a rock formation, only the erosion-resistant and abrasion-resistant material of base 42 and the superabrasive material of cutting table 52 are exposed to the drilled formation, the formation debris, the drilling fluid, and the other hostile conditions that are typically present during drilling. Thus, the area of substrate 40 that is peripherally adjacent to and to the rear of superabrasive cutting table 52 resists erosion and abrasion, thereby preventing the wearing away of the material of the substrate 40 adjacent and to the rear of superabrasive cutting table 52 and the consequent formation of a lip of protruding superabrasive material adjacent the periphery of superabrasive cutting table 52. Thus, substrate 40 may be more likely than conventional substrates to provide continued peripheral support and stiffness to superabrasive cutting table 52 during prolonged periods of drilling. Consequently, the likelihood that superabrasive cutting table 52 may be fractured or otherwise damaged at its periphery may be reduced by substrate 40.

Since the material of core 48 is more ductile than that of base 42, core 48 imparts substrate 40 with some additional shock absorption properties. The erosion-resistant and abrasion-resistant material of base 42 that will be exposed as substrate 40 is secured to a bit body 14 protects the more ductile material of the core 48 and prevents the wearing away or erosion of core 48. Thus, in use of a drill bit 10 that includes one or more substrates 40, the shock absorption characteristics of each substrate 40 will not be significantly diminished during the drilling operation for a prolonged period due to the presence of base 42.

Moreover, as core 48 comprises a more ductile material than base 42, impacts upon superabrasive cutting table 52 during drilling may be, at least in part, absorbed by core 48. Thus, the likelihood of impact damage to a superabrasive cutting table 52 that is secured to the cutting element 40 of the present invention is reduced.

Referring now to FIGS. 3 and 4, another embodiment of substrate 40' is illustrated. As with the embodiment of substrate 40 described in reference to FIGS. 1 and 2, substrate 40' includes a base 42' and a core 48' disposed in a cavity 44' of base 42'. A cutting end 50' of core 48' is, however, recessed relative to a cutting end 46' of base 42' rather than substantially flush therewith.

As in the embodiment of substrate 40 described in reference to FIGS. 1 and 2, base 42' of substrate 40' comprises an erosion-resistant and abrasion-resistant material, while core 48' comprises a more ductile material. Accordingly, as a superabrasive cutting table 52 is secured to cutting end 50' of core 48', a peripheral edge of superabrasive cutting table 52 will be at least partially shielded by base 42' at cutting end 46'.

Preferably, the distance at which superabrasive cutting table 52 is recessed relative to cutting end 46' of base 42' is less than the thickness of a superabrasive cutting table 52 (see FIGS. 1 and 2) to be secured to substrate 40'. Thus, in use, an exposed peripheral edge of superabrasive cutting table 52 may contact and, thus, cut into the formation to be drilled while the region of base 42' adjacent and surrounding a lower edge of superabrasive cutting table 52 may resist wear and, thereby, continue to support superabrasive cutting table 52 during use.

Figure 12:
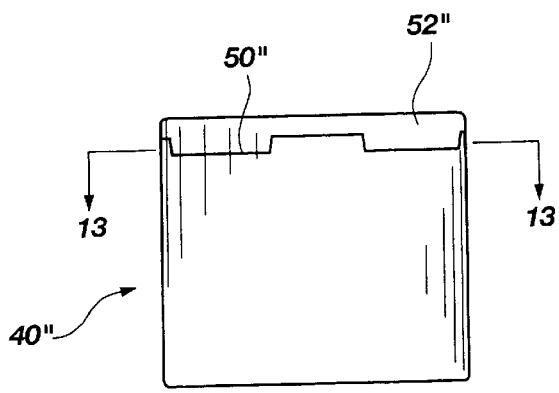
FIG. 12 is a perspective view illustrating a first embodiment of a contoured interface between a cutting element substrate and a superabrasive cutting table secured thereto.
Figure 13:
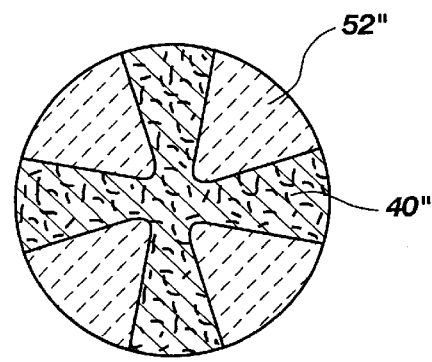
FIG. 13 is cross-section taken along line 13—13 of FIG. 12.
Figure 14:
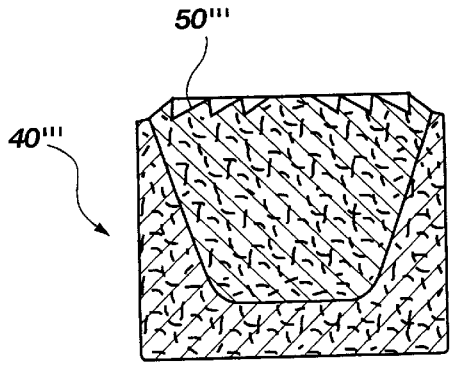
FIG. 14 is a cross-section of a second embodiment of a cutting element substrate having a contoured cutting end.
Figure 15:
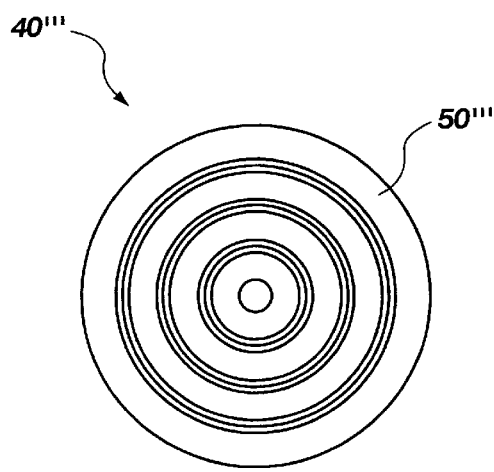
FIG. 15 is a top plan view of the cutting element substrate of FIG. 14.

With reference to FIGS. 12–15, cutting end 50 of core 48 may be non-planar or contoured to impart cutting end 50 with an increased surface area, which increases the adhesion of a cutting table 52 to substrate 40. FIGS. 12 and 13 illustrate a substrate 40" with a cutting end 50" having a so-called cross-cutter or "RAD-X" contour thereon. FIGS. 14 and 15 depict a substrate 40''' having on the cutting end 50''' thereof a so-called "AXYM" or concentric contour that, in cross-section, resembles the teeth of a saw. Of course, the cutting tables 52", 52''' are securable to cutting ends 50", 50''' of substrates 40", 40''', respectively. Other non-planar interfaces between the cutting element substrate and the cutting table may also be employed in the cutting elements and cutting element substrates of the present invention.

Figures 5, 6:
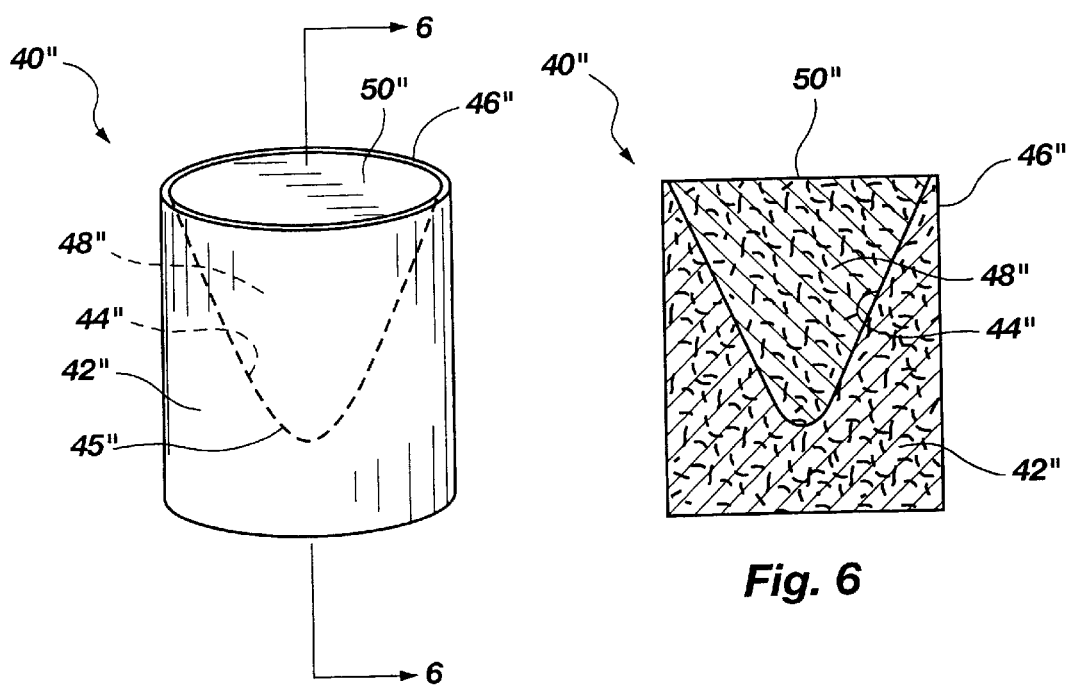
FIG. 5 is a perspective view of a variation of the embodiment of FIG. 3, wherein the shapes of the cavity and the core of the cutting element substrate are different from the shapes of the cavity and core of the cutting element substrate of FIG. 3.
FIG. 6 is a cross-section through line 6—6 of FIG. 5.

Turning now to FIGS. 5 and 6, another substrate 40", which is a variation of the substrate 40' depicted in FIGS. 3 and 4, is illustrated. As FIGS. 5 and 6 show, substrate 40" includes a base 42" with a substantially conical cavity 44" defined substantially centrally therein and a substantially conical core 48" that is configured complementarily to cavity 44" to facilitate insertion of core 48" into base 44". The configurations of cavity 44" and core 48" differ from those of cavity 44' and core 48' of the substrate 40' illustrated in FIGS. 3 and 4. As shown by broken line 45" in FIG. 5, cavity 44" and complementary core 48" may be frustoconical.

Referring now to FIGS. 8 and 9, another embodiment of the cutting element substrate 140 according to the present invention is illustrated. A lateral lip region 149 of core 148 of substrate 140 is exposed at the periphery of substrate 140 in a ring-like fashion, between cutting table 152 and base 142. Since the material of core 148 is less erosion-resistant and abrasion resistant than base 142, this configuration facilitates the removal of material from lateral lip region 149 during use of the cutting element. As the exposed material of lateral lip region 149 erodes, or is removed from substrate 140, the periphery of cutting table 152 becomes unsupported. The unsupported portions of cutting table 152 break off of cutting table 152, thereby sharpening the cutting element. Thus, a cutting element that includes cutting element substrate 140 is self-sharpening.

FIGS. 10 and 11 show a variation of cutting element substrate 140', which has a conically shaped core 148'. Of course, the base and core of a cutting element substrate according to the present invention may have other configurations than those illustrated in FIGS. 8–11.

Preferably, substrate 40 is fabricated by a process that facilitates the configuration of two different forms of carbide in robust enough form to provide a base 42 and core 48 of desired configuration while preventing the likelihood of cracking or other damage to cutting element 40 during fabrication, the subsequent assembly of cutting element 40 to other components of a finished earth-boring drill bit, or the subsequent use of cutting element 40.

Referring again to FIGS. 1 and 2, in a first embodiment of a method of fabricating substrate 40, prior to sintering or hot isostatic pressing the matrix material and the binder of base 42 and core 48, the matrix material and the binder of base 42 and core 48 may be preformed with an adhesive material. Base 42 and core 48 may be preformed by disposing mixtures of desired proportions of matrix material, binder, and adhesive for each of base 42 and core 48 into molds. Of course, the configuration of the molds corresponds to the desired configuration of the respective base 42 or core 48 to be formed thereby.

In order to account for the additional adhesive material employed, as well as for the subsequent compacting of each of base 42 and core 48 during sintering or hot isostatic pressing, the size of the mold cavities is somewhat larger than the size of a finished base 42 or core 48. The size of a finished base 42 or core 48 that is fabricated with a mold in accordance with the present embodiment of the fabrication method could be readily determined by those of skill in the art when the proportions of matrix material and binder material, the amount and type of adhesive employed, the temperature and amount of pressure employed by the sintering or hot isostatic pressing process, and other factors are known.

The preformed base 42 and core 48 may be integrally secured to one another by known processes, such as by assembling base 42 and core 48, disposing the assembly of base 42 and core 48 within a mold, and sintering or hot isostatic pressing the assembly of base 42 and core 48 together to form a finished substrate 40.

In an alternative embodiment of a method of fabricating substrate 40, base 42 and core 48 may be individually fabricated by known processes, such as by sintering or hot isostatic pressing. The fabricated base 42 and core 48 may then be assembled and secured to one another by known processes, such as by an interference fit or other mechanical means, by brazing, or by disposing base 42 and core 48 into a mold and applying pressure and/or heat to the assembly of base 42 and core 48, such as in a diamond press during fabrication of cutting table 52 thereon and, thereby, effectively sintering or hot isostatic pressing base 42 and core 48 together.

In yet another embodiment of the fabrication method, desired proportions of the particulate matrix material and binder of base 42 may be disposed within a cavity of a first mold and either preformed by means of an adhesive or other temporary binder material or sintered or hot isostatic pressed to form a finished base 42. Base 42 may be disposed in a cavity of a second mold and a second mixture of particulate matrix material and binder disposed within cavity 44 of base 42 to define core 48 of substrate 40. The second material may be sintered or hot isostatic pressed to form core 48 and to substantially integrate core 48 and base 42 and, thereby, form a finished substrate 40.

Another embodiment of the fabrication method of the present invention includes prefabricating base 42 of a first cemented carbide and a complementarily shaped core 48 of a second cemented carbide by known processes, such as by the processes described above. Preferably, both base 42 and core 48 are sintered or HIPed in order to define the configuration of cutting end 46 of core 48 prior to forming a superabrasive cutting table 52 thereon. Base 42 and core 48 may be assembled and disposed within a diamond press. Diamond crystals or crystals of another superabrasive material (e.g., cubic boron nitride) are also disposed in the press, adjacent the exposed cutting end 46 of core 48. As sufficient pressure is applied to the superabrasive crystals to fabricate a superabrasive cutting table 52 at cutting end 46 of core 48, base 42, core 48, and superabrasive cutting table 52 may be integrally secured together under pressure of the diamond press, as known in the art.

Of course, other methods of fabricating substrate 40 are also well within the skill of those in the art and are, therefore, also within the scope of the present invention. Although the foregoing fabrication methods have been described with reference to the substrate 40 illustrated in FIGS. 1 and 2, these methods may also be employed to fabricate other substrates that are within the scope of the present invention.

Referring again to FIG. 7, the substrates 40, 40', or 40" of the present invention may be oriented upon a bit body 14 of an earth-boring drill bit 10 by disposing cutting elements comprising superabrasive cutting tables 52 secured to substrates 40, 40', or 40" within a receptacle 26 of bit body 14 and by securing a substrate 40, 40', or 40" to the receptacle 26 within which they have been disposed. Known processes, such as brazing or adhesives, may be employed to secure a cutting element substrate 40, 40', or 40" to a receptacle 26 of bit body 14.

Although the foregoing description contains many specifics and examples, these should not be construed as limiting the scope of the present invention, but merely as providing illustrations of some of the presently preferred embodiments. For example, the substrates of the present invention are illustrated as being useful in association with a drag-type earth-boring rotary drill bit. Similarly, other embodiments of the invention may be devised which do not depart from the spirit or scope of the present invention. The scope of this invention is, therefore, indicated and limited only by the appended claims and their legal equivalents, rather than by the foregoing description. All additions, deletions and modifications to the invention as disclosed herein and which fall within the meaning of the claims are to be embraced within their scope.

What is claimed is:

1. A substrate for use with an earth-boring drill bit, comprising:
   an erosion-resistant and abrasion-resistant outer shell including a cavity open to a single end thereof, said cavity extending into a substantial majority of said outer shell, said outer shell defining an exterior surface of the substrate other than a cavity opening; and
   a core comprising carbide, steel, or ceramic and configured to fit within said cavity, said core comprising a more ductile material than said outer shell and said core being configured and located within the cavity to absorb impact upon a cutting table positioned directly over an end of said core.

2. The substrate of claim 1, wherein said outer shell comprises carbide, steel, or ceramic.

3. The substrate of claim 1, wherein said outer shell comprises a carbide.

4. The substrate of claim 3, wherein said carbide comprises tungsten carbide.

5. The substrate of claim 3, wherein said core comprises a carbide.

6. The substrate of claim 5, wherein said carbide of said core comprises tungsten carbide.

7. The substrate of claim 6, wherein a carbide content, by volume, of said outer shell is greater than a carbide content, by volume, of said core.

8. The substrate of claim 5, further including a binder in said carbides and wherein a binder content of said outer shell is less than a binder content of said core.

9. The substrate of claim 8, wherein said binder comprises cobalt.

10. The substrate of claim 9, wherein said binder comprises a cobalt alloy.

11. The substrate of claim 8, wherein said binder comprises iron.

12. The substrate of claim 8, wherein said binder comprises an iron alloy.

13. The substrate of claim 8, wherein said binder comprises nickel.

14. The substrate of claim 8, wherein said binder comprises a nickel alloy.

15. The substrate of claim 5, wherein said carbide of said outer shell has a smaller grain size than a grain size of said carbide of said core.

16. The substrate of claim 1, wherein a material of said outer shell is more erosion-resistant and abrasion-resistant than a material of said core.

17. The substrate of claim 1, wherein an exposed end of said core is substantially flush with a corresponding end of said outer shell.

18. The substrate of claim 1, wherein an exposed end of said core is recessed relative to a corresponding end of said outer shell.

19. The substrate of claim 1, wherein a material of said core is tougher than a material of said outer shell.

20. A cutting element for use with a rotary-type earth-boring drill bit, comprising:
a substrate including an erosion-resistant and abrasion-resistant base including a substantially centrally located cavity opened only to a cutting end of the base and configured to receive a substantially complementarily-shaped, more ductile core comprising carbide, said cavity extending into a substantial majority of said base defining an exterior surface of said substrate other than a cavity opening; and
a superabrasive cutting table disposed directly over said core, proximate said cutting end of said base, said core being configured and located within the cavity to absorb impact upon said cutting table.

21. The cutting element of claim 20, wherein said base comprises a carbide.

22. The cutting element of claim 21, wherein said carbide comprises tungsten carbide.

23. The cutting element of claim 21, wherein said carbide of said core comprises tungsten carbide.

24. The cutting element of claim 23, further including a binder in said carbides and wherein a binder content of said base is greater than a binder content of said core.

25. The cutting element of claim 24, wherein said binder comprises cobalt.

26. The cutting element of claim 24, wherein said binder comprises iron.

27. The cutting element of claim 24, wherein said binder comprises nickel.

28. The cutting element of claim 21, wherein said carbide of said base has a smaller grain size than said carbide of said core.

29. The cutting element of claim 20, wherein said base is more abrasion-resistant and erosion-resistant than said core.

30. The cutting element of claim 20, wherein a material of said core is tougher than a material of said base.

31. The cutting element of claim 20, wherein a cutting end of said core is substantially flush with the cutting end of said base.

32. The cutting element of claim 31, wherein said superabrasive cutting table is disposed adjacent said cutting end of said core and said cutting end of said base.

33. The cutting element of claim 20, wherein a cutting end of said core is recessed relative to said cutting end of said base.

34. The cutting element of claim 33, wherein a base end of said superabrasive cutting table is disposed adjacent said cutting end of said core and a periphery of said base at said cutting end thereof is disposed at least partially around a periphery of said superabrasive cutting table.

35. The cutting element of claim 20, wherein said superabrasive cutting table comprises a polycrystalline diamond compact.

36. The cutting element of claim 35, wherein said polycrystalline diamond compact comprises a thermally stable polycrystalline diamond compact.

37. The cutting element of claim 20, wherein a peripheral configuration of said superabrasive cutting table is substantially the same as a peripheral configuration of a cutting end of said core.

38. The cutting element of claim 20, wherein said base and said superabrasive cutting table substantially enclose said core.

39. An earth-boring drill bit, comprising:
at least one substrate secured thereto and including:
an erosion-resistant and abrasion-resistant outer shell including a cavity open to a single end thereof, said cavity extending into a substantial majority of said outer shell, said outer shell defining an exterior surface of said at least one substrate other than a cavity opening; and
a core configured to fit within said cavity, comprising a carbide, and having a greater ductility that said outer shell, said core being configured and located within the cavity to absorb impact upon a cutting table positioned directly over an end of said core.

40. An earth-boring drill bit, comprising:
a bit body; and
at least one cutting element secured to said bit body, said at least one cutting element comprising:
a substrate including an erosion-resistant and abrasion-resistant base including a substantially centrally located, close-ended cavity opened to a cutting end of the base, said close-ended cavity extending into a substantial majority of said base, said base defining an exterior surface of said substrate other than a cavity opening, said close-ended cavity receiving a substantially complementarily-shaped core therewithin, said core comprising a carbide and having a greater toughness than a material of said base; and
a superabrasive cutting table disposed directly over said core, proximate said cutting end of said base, said core being configured and located within said cavity to absorb impact upon said cutting table.

41. The earth-boring drill bit of claim 40, wherein only an outer shell of said substrate is exposed.

42. A method of fabricating a substrate, comprising:
forming a first mixture of a matrix material and a binder into an erosion-resistant and abrasion-resistant outer shell including an open cavity therein continuous with one end of said outer shell, said open cavity extending into a substantial majority of said outer shell, said outer shell defining an exterior surface of the substrate other than a cavity opening;
forming a second mixture of carbide and a binder into a core exhibiting greater ductility than said outer shell, complementary in shape to said open cavity and configured to be insertable therein;

assembling said outer shell and said core such that said core is configured and located within said cavity to absorb impact upon a cutting table positioned directly over and end of said core; and securing said outer shell and said core to one another.

43. The method of claim 42, wherein said forming said first mixture into said outer shell comprises securing said matrix material and said binder with a temporary binder.

44. The method of claim 42, wherein said forming said first mixture into said outer shell comprises securing said matrix material and said binder with an adhesive material.

45. The method of claim 42, wherein said forming said first mixture into said outer shell comprises sintering said matrix material and said binder.

46. The method of claim 42, wherein said forming said second mixture into said core comprises hot isostatic pressing said carbide and said binder.

47. The method of claim 42, wherein said forming said second mixture into said core comprises securing said carbide and said binder with a temporary binder.

48. The method of claim 42, wherein said forming said second mixture into said core comprises securing said carbide and said binder with an adhesive material.

49. The method of claim 42, wherein said forming said second mixture into said core comprises sintering said carbide and said binder.

50. The method of claim 42, wherein said forming said second mixture into said core comprises hot isostatic pressing said carbide and said binder.

51. The method of claim 42, wherein said securing comprises applying pressure to said outer shell and said core.

52. The method of claim 42, wherein said securing comprises sintering said outer shell and said core to one another.

53. The method of claim 42, wherein said securing comprises hot isostatic pressing said outer shell and said core to one another.

54. The method of claim 42, wherein said securing comprises brazing said outer shell and said core to one another.

55. The method of claim 42, wherein said securing comprises mechanically affixing said outer shell and said core to one another.

56. The method of claim 42, further comprising securing a superabrasive cutting table to an exposed surface of said core.

57. The method of claim 56, wherein said securing said superabrasive cutting table includes fabricating said superabrasive cutting table on said exposed surface.

58. The method of claim 56, wherein said securing said outer shell and said core and said securing said superabrasive cutting table are effected substantially simultaneously.

59. A method of fabricating a substrate, comprising:

disposing a first mixture of a matrix material, a binder, and an adhesive material within a cavity of a mold to form an erosion-resistant and abrasion-resistant base of the substrate, said base having a cavity formed therein, said base defining an exterior surface of the substrate other than a cavity opening;

disposing a second mixture of a matrix material, a binder, and an adhesive material within another cavity of another mold to form a core exhibiting greater ductility than the base of the substrate;

assembling said base and said core, said core extending into a substantial majority of said base, said core being configured and located within said cavity to absorb impact upon a cutting table positioned directly over an end of said core; and securing said base and said core to one another.

60. The method of claim 59, wherein said securing comprises sintering.

61. The method of claim 59, wherein said securing comprises hot isostatic pressing.

62. The method of claim 59, further comprising securing a superabrasive cutting table to an exposed surface of said core.

63. The method of claim 62, wherein said securing said superabrasive cutting table includes fabricating said superabrasive cutting table on said exposed surface.

64. The method of claim 62, wherein said securing said base and said core and said securing said superabrasive cutting table occur substantially simultaneously.

65. A method of fabricating a substrate, comprising:

forming an erosion-resistant and abrasion-resistant outer shell of the substrate from a first mixture comprising a matrix material and a binder material, said outer shell having a cavity formed therein that extends a majority of a distance into said outer shell, said outer shell also defining an outer surface of the substrate other than a cavity opening;

disposing a second mixture comprising a matrix material and a binder material within the cavity of said outer shell to form a core exhibiting greater ductility than the outer shell, said core being configured and located within said cavity to absorb impact upon a cutting table positioned directly over an end of said core; and securing said outer shell to said core.

66. The method of claim 65, wherein said forming comprises including an adhesive material in said first mixture to performing said outer shell.

67. The method of claim 65, wherein said securing comprises sintering said outer shell and said second mixture.

68. The method of claim 65, further comprising securing a superabrasive cutting table to an exposed surface of said core.

69. The method of claim 68, wherein said securing said superabrasive cutting table includes fabricating said superabrasive cutting table on said exposed surface.

70. The method of claim 68, wherein said securing said outer shell and said core and said securing said superabrasive cutting table are effected substantially simultaneously.

* * * * *

UNITED STATES PATENT AND TRADEMARK OFFICE
CERTIFICATE OF CORRECTION

PATENT NO. : 6,216,805 B1
DATED : April 17, 2001
INVENTOR(S) : Lays et al.

It is certified that error appears in the above-identified patent and that said Letters Patent is hereby corrected as shown below:

Column 1,
Line 30, after "erosion-resistance" change ";" to -- , --;

Column 2,
Line 29, change "abrasion resistant" to -- abrasion-resistant --;
Line 62, change "impact resistant" to -- impact-resistant --;

Column 3,
Line 52, change "performing" to -- preforming --;

Column 5,
Line 56, before "22," insert -- region --;
Line 58, after "gage" insert -- region --;

Column 7,
Line 55, after "element" insert -- substrate --;

Column 8,
Line 36, change "base 44"." to -- cavity 44" of base 42". --;
Line 48, change "abrasion resistant" to -- abrasion-resistant --;
Line 64, after "in" insert -- a --;
Line 66, after "element" insert -- substrate --;

Column 9,
Lines 1 and 3, after "element" insert -- substrate --.

Column 11,
Line 51, change "base" to -- core --; and change "core" to -- base --;

Column 12,
Line 34, change "that" to -- than --;
Line 56, after "said" insert -- superabrasive --;

Column 13,
Line 6, after "over" change "and" to -- an --; and

UNITED STATES PATENT AND TRADEMARK OFFICE
CERTIFICATE OF CORRECTION

PATENT NO. : 6,216,805 B1
DATED : April 17, 2001
INVENTOR(S) : Lays et al.

It is certified that error appears in the above-identified patent and that said Letters Patent is hereby corrected as shown below:

Column 14,
Line 45, change "performing" to -- preform --.

Signed and Sealed this

Thirtieth Day of April, 2002

Attest:

JAMES E. ROGAN
*Director of the United States Patent and Trademark Office*

*Attesting Officer*